Oct. 3, 1944.    J. O. SIMPSON    2,359,719
METHOD OF FACING METAL PLATES
Filed Jan. 24, 1942    2 Sheets-Sheet 1
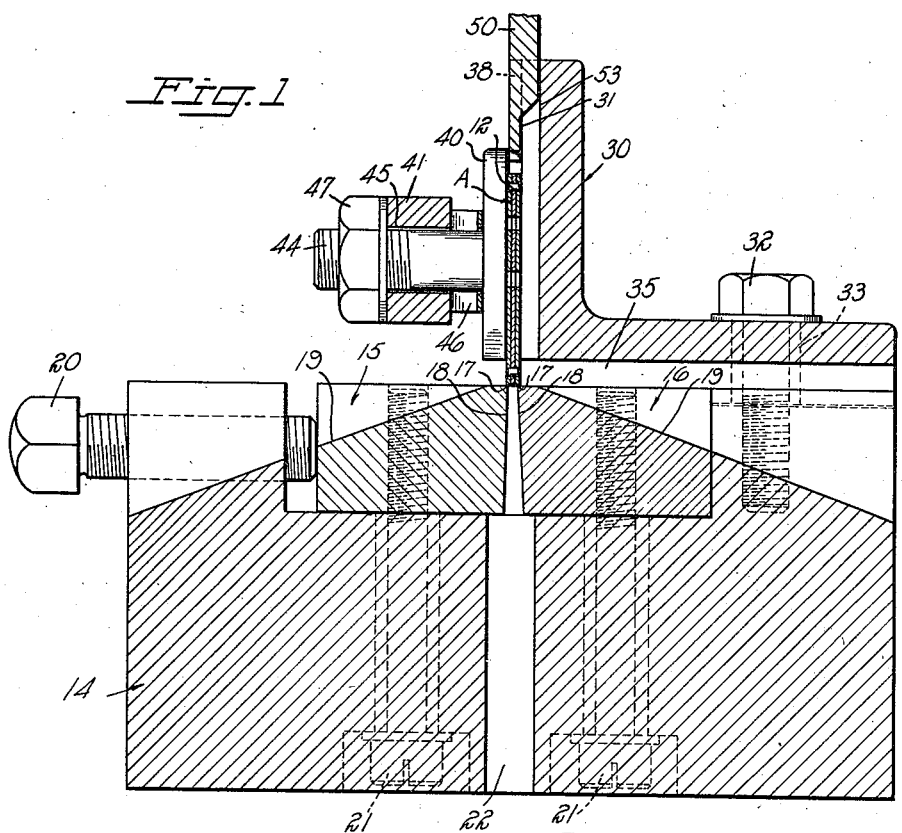
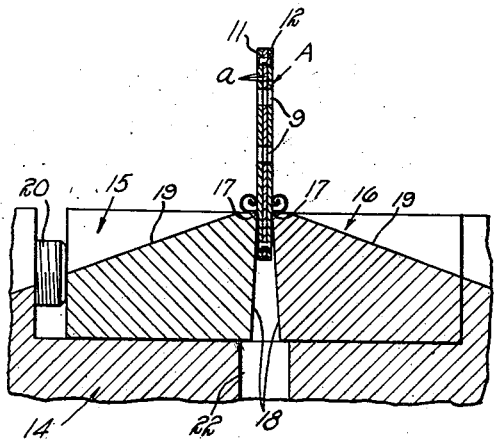
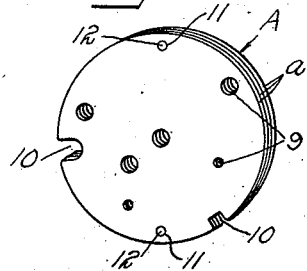
Inventor
JOHN O. SIMPSON
By Lindsey and Robillard
Attorneys

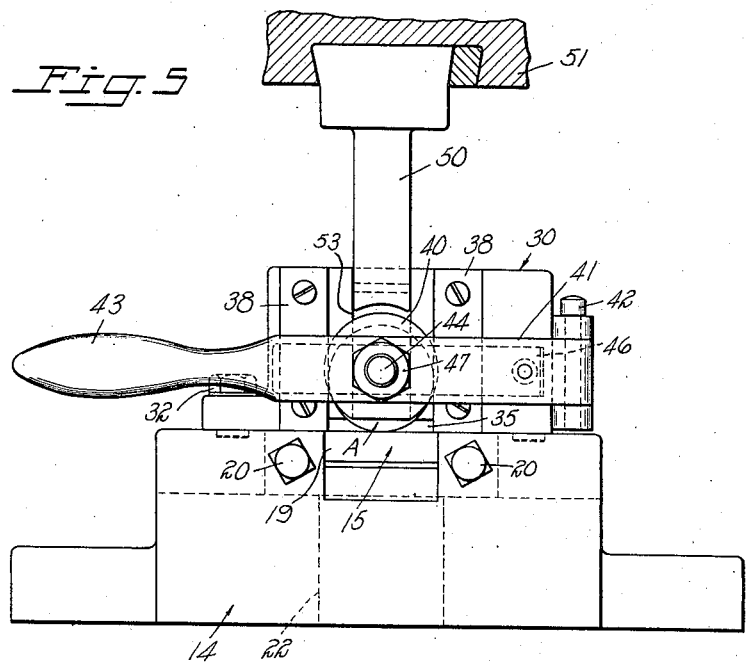
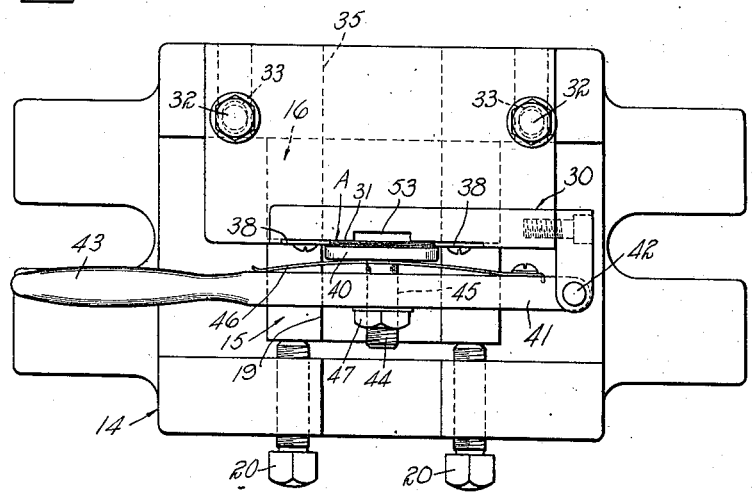

Patented Oct. 3, 1944

2,359,719

UNITED STATES PATENT OFFICE 2,359,719

METHOD OF FACING METAL PLATES

John O. Simpson, Forestville, Conn., assignor to The E. Ingraham Company, Bristol, Conn., a corporation of Connecticut Application January 24, 1942, Serial No. 428,099

2 Claims. (Cl. 90—24)

This invention relates to a method of finishing or facing the sides of plates, preferably made of a plurality of thin metal pieces or disks pinned together, so that the sides of the finished plates are flat and parallel and the plates are accurately brought to the desired thickness or gauge. As an instance of a use to which the present invention may be applied, reference may be had to the facing of plates used in horological instruments.

It is desirable to form the plates from sheet metal by stamping out pieces of like configuration, and, after providing the pieces with openings or holes therein, to assemble two or more of the pieces in registered relation and then dowel the assembled pieces together. The sheet metal from which the pieces are stamped is not usually of uniform thickness and is likely to be warped, with the result that the opposite faces of the multi-ply plates formed therefrom are not of uniform thicknesses and the faces thereof are uneven and not flat. Heretofore, it has been the practice to resort to grinding operations to bring the plates to uniform thickness, but such operations are tedious and expensive to carry out.

The aim of the present invention is to provide an improved method of surfacing or facing the faces of the multi-ply plates whereby the plates are very quickly and economically brought to uniform thickness with the faces thereof flat and parallel to one another.

More particularly, in accordance with the present invention, the multi-ply plates are made flat and of uniform thickness by shaving from one or more faces of the plate a thin shaving or shavings by forcing the plate edgewise through a shaving die. This operation may be very quickly carried out without the use of expensive machinery, and the results are eminently satisfactory as to thickness of the plate, and flatness and parallelism of the faces thereof.

Referring to the accompanying drawings, wherein is shown, for illustrative purposes, one embodiment of a machine or device which may be employed to carry out the improved method of the present invention:

Figure 1 is a vertical cross sectional view through the machine, a plate being shown about to be passed through a shaving die;

Fig. 2 is a view similar to Fig. 1 and shows the plate partially passed through the die;

Fig. 3 is a perspective view of the finished plate;

Fig. 4 is a view of one of the shavings cut from a face of the plate;

Fig. 5 is a front elevational view of the shaving apparatus; and

Fig. 6 is a top plan view of what is shown in Fig. 5 with the pusher or blade for forcing the plate through the die omitted.

Referring to the drawings in detail, A designates a plate formed of a plurality of pieces $a$ of like size, these pieces having been preferably stamped from sheet metal. In the present disclosure, the pieces are shown as being in the form of flat round disks but obviously they may be square or have any suitable configuration. After stamping the pieces, holes 9 and notches 10 are formed therein in the desired number and position depending on the use to which the built-up plates are to be placed. Two small holes 11 are preferably provided at diametrically opposite points adjacent the margin of the pieces. After the pieces have been formed and apertured, they are assembled in the desired number (three being shown in the present instance) with corresponding holes and notches in registry with one another, and the pieces are held in this assembled relation by dowels or pins 12 forced into registering holes 11. As stated, since the pieces or disks are stamped from sheet metal, the several plates built up therefrom may not all be of the same thickness, and their faces may be uneven and non-parallel. Preferably, the multi-ply plates are initially made of a slightly greater thickness than that ultimately desired so as to permit substantial shavings to be taken from their faces.

In accordance with the present invention, in order to face the sides of the plates, the latter are forced edgewise through a die, the opposed cutting edges of which are parallel and spaced apart corresponding to the desired ultimate thickness of the finished plate. In the present instance, the die is formed of two die blocks 15 and 16 supported by a base or bed plate 14. The die blocks have opposed parallel shaving edges or corners 17, and the opposed faces 18 of the blocks are slightly divergent in a downward direction so as to allow clearance for the plates as they pass therebetween. The upper faces of the die blocks are preferably chamfered or beveled downwardly and outwardly as at 19 so as to allow for clearance of the chips or shavings and to permit the shavings to roll or slide towards the front and rear faces of the base. Furthermore, by preference, at least one of the die blocks is adjustably secured to the base so as to permit of the cutting edges to be accurately brought into spaced relation corresponding to the desired thickness to be given to the plates. To the latter end, the die block 15 may be adjusted towards the other one by means of the screws 20. The die blocks may be clamped in position by screws 21. The base plate below the space between the die blocks has a vertical slot 22 through which the plates drop after they have passed downwardly between the die blocks.

Secured to the upper face of the base is a back rest or guide 30 which is here shown in the form of an angle iron, the forward face 31 of which is perpendicular to the plane of the cutting edges 17, 17 and slightly spaced rearwardly of the edge 17 of the die block 16. This back rest is preferably adjustable at right angles to the face 31 thereof, and to this end the bolts 32 which clamp the back rest in place on the base pass through elongated openings 33 in the horizontal leg of the back rest. The under side of the angle plate 30 is grooved at as 35 in registry with the chamfered portion 19 of the rear die block. Secured to the forward face 31 of the back rest are vertical shims 38, the opposed edges of which are parallel and spaced apart according to the diameters of the plates to be operated upon.

While each plate is being forced downwardly through the die, it is resiliently held against the vertical face 31 of the back rest, and to this end a presser plate 40 resiliently carried by a lever 41 is provided. The lever 41 is pivoted at one end on a vertical pin 42 and has a handle 43 at its other end. The presser plate 40 has a threaded stud 44 mounted for longitudinal movement in an opening 45 in the lever 41. Between the presser plate and the lever and secured at one end to the lever is a leaf spring 46. Movement of the presser plate with respect to the lever is limited by a nut 47 screwed on the stud 44.

For the purpose of forcing the plates edgewise through the die, a pusher blade 50 is provided. This blade is carried by a suitable plunger or ram 51. The lower end of the blade slides in a vertical groove 53 in the vertical face of the back rest.

It will be understood from the foreing description taken in connection with the accompanying drawings that when it is desired to carry out the method of the present invention by means of the apparatus described, a plate is placed, as shown in Fig. 1, against the front face of the back rest and is urged against that face by moving the lever 41 towards the same. Then the pusher blade 50 is moved downwardly so as to force the plate edgewise through the shaving die. When the plate is thus moved through the die, the cutting edges 17 cut shavings from the opposite faces of the plate. These shavings curl up as shown in Fig. 2. A complete shaving is shown in Fig. 4. After the plate has thus been shaved, it is of the exact size desired, and the faces thereof are parallel and flat.

I claim as my invention:

1. The herein described method which consists in forming a rigid plate of generally uniform thickness comprising a plurality of like stamped-out metal pieces pinned together, and cutting shavings substantially coextensive with the faces of said plate from the opposite faces of said plate and thus reducing the thickness of said plate and making the faces thereof parallel and flat by pushing, under force, the plate through a shaving die having parallel cutting edges spaced apart a lesser distance than the thickness of said plate.

2. The herein described method of facing rigid plates of generally uniform thickness and comprising a plurality of like stamped-out sheet metal pieces pinned together in registering relation, which consists in positioning the plate against a surface disposed at right angles to the plane which includes a pair of parallel cutting edges of a shaving die of leser width than the thickness of the plate, pressing said plate aginst said surface, and pushing, under force, said plate while so pressed edgewise through said die whereby shavings substantially coextensive with the faces of said plate are taken from the opposite faces of said plate to bring said plate to the desired thickness with its faces parallel and flat.

JOHN O. SIMPSON.